United States Patent [19]

Walther

[11] Patent Number: 4,751,767
[45] Date of Patent: Jun. 21, 1988

[54] POULTRY STUNNER

[75] Inventor: Jeffrey H. Walther, Salisbury, Md.

[73] Assignee: Perdue Incorporated, Salisbury, Md.

[21] Appl. No.: 7,239

[22] Filed: Jan. 27, 1987

[51] Int. Cl.$^4$ .............................................. A22B 3/06
[52] U.S. Cl. ......................................... 17/1 E; 17/11
[58] Field of Search .................................... 17/1 E, 11

[56] References Cited

U.S. PATENT DOCUMENTS

| | | |
|---|---|---|
| 3,564,645 | 2/1971 | Brugman . |
| 3,702,017 | 11/1972 | Lewis . |
| 3,828,397 | 8/1974 | Harben, Jr. . |
| 3,918,123 | 11/1975 | Harben, Jr. . |
| 3,981,045 | 9/1976 | Collins . |
| 4,092,761 | 6/1978 | McWhirter . |
| 4,153,971 | 5/1979 | Simonds . |

FOREIGN PATENT DOCUMENTS

| | | | |
|---|---|---|---|
| 610784 | 3/1935 | Fed. Rep. of Germany | 17/1 E |
| 0623540 | 8/1978 | U.S.S.R. | 17/1 E |

Primary Examiner—Willie G. Abercrombie
Attorney, Agent, or Firm—Hoffman, Wasson & Fallow

[57] ABSTRACT

The poultry stunner described herein comprises a poultry conveyor and an electrolyte bath below the conveyor and means for applying an electric potential between the conveyor and the bath so as to stun birds on the conveyor as their heads are passed through the bath. The electrolyte bath is continuously aerated and a drainage rack at the end of the basin recovers electrolyte that would otherwise be lost.

8 Claims, 3 Drawing Sheets

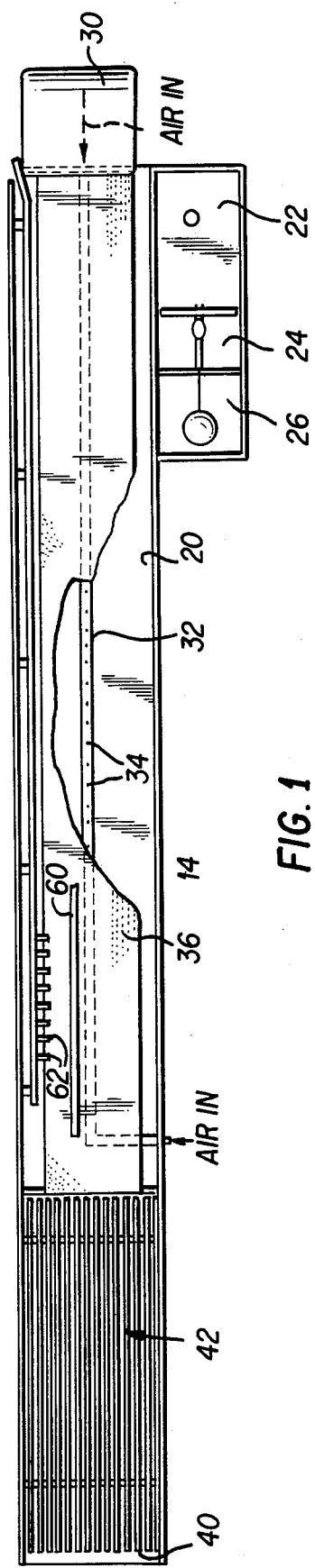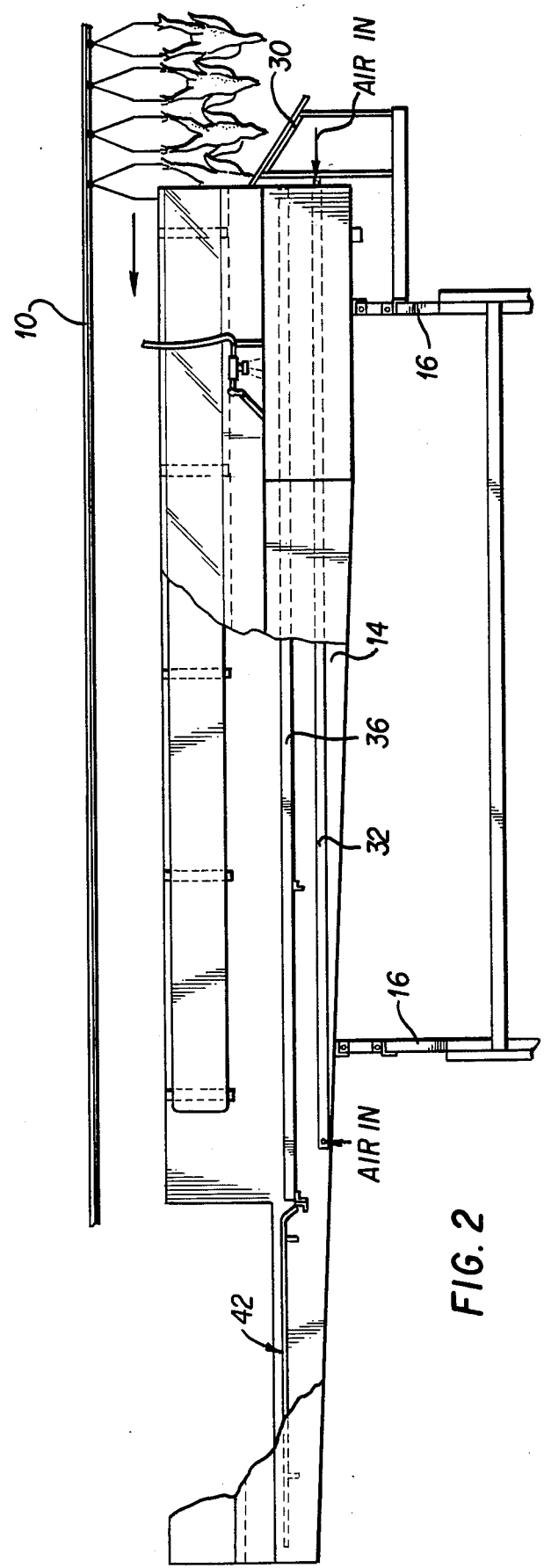

POULTRY STUNNER

BACKGROUND OF THE INVENTION

This invention relates to the art of slaughtering and in particular to a device for stunning birds before they are killed.

In modern day poultry processing, live birds are suspended from a foot shackle type overhead conveyor and then are advanced to a station where they are automatically killed. En route to this station it is desirable to stun the birds so that they are relatively immobile, brain activity is decreased, and in proper position for the killing device. Various stunning devices are disclosed in the prior art and these typically involve passing an electrical current through each bird. One example is found in U.S. Pat. No. 3,564,645 wherein an alternating current is impressed across two electrodes one of which communicates with the feet of the suspended bird and the other of which is in the form of an electrolyte bath which the heads of the birds contact. Other pertinent devices are shown in U.S. Pat. Nos. 3,702,017; 3,828,397; 3,918,123; and 4,092,761.

A stunner should uniformly stun the birds passing through it despite the birds' various behavior on approach to the stunner. The degree of stunning is important; that is, the bird should be rendered immobile yet not be over-stunned since the latter can cause physiological damage and thus decrease yields. Furthermore, a stunner should be inexpensive to produce and economical of electricity and electrolyte in use.

Commonly used prior art stunners are notoriously wasteful of electrolyte, in particular, because not only is a certain amount of electrolyte carried off by the birds as they are passed through the stunner, but also the heads of the birds tend to plow or push water out of the stunner basin. And, despite the numerous stunner designs available, none provides what we consider acceptable uniformity in its effect from bird to bird.

In view of the foregoing, one object to the invention is to produce a device for stunning poultry that minimizes the consumption of electrolyte per bird.

Another object to the invention is to control the concentration of an electrolyte solution inasmuch as the stunning effect is highly dependent upon the concentration.

Another object is to minimize the unit electrical consumption in such a stunner.

A further object is to maximize the certainty that a given bird will be adequately stunned while preventing over-stunning and consequent tissue and joint damage.

Yet another object is to achieve the foregoing with a simple and inexpensive apparatus not dependent upon complex controllers and the like and not requiring frequent adjustment.

These and other objects are met by a stunner comprising a conveyor for carrying suspended birds along a predetermined path, an electrolyte bath extending below the conveyor for a portion for the path, means for impressing an electrical potential between the conveyor and the bath, means for aerating the electrolyte, and means for recovering electrolyte from the birds downstream from said basin.

BRIEF DESCRIPTION OF THE DRAWINGS

In the accompanying drawings:

FIG. 1 is a side elevation of a stunner embodying the present invention;

FIG. 2 is a top view thereof;

DESCRIPTION OF THE PREFERRED EMBODIMENT

Figure 3:
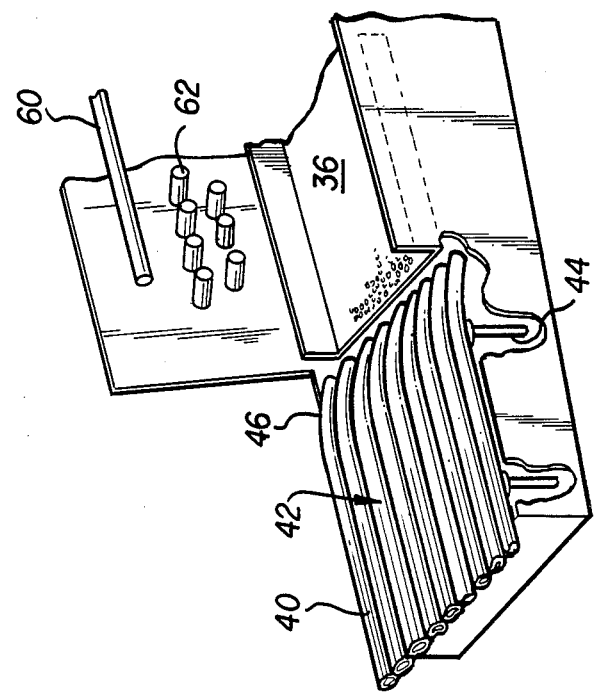
FIG. 3 is a detailed perspective view of portion thereof.

A poultry stunner embodying the invention, as shown in FIGS. 1-3, comprises an overhead conveyor 10 (FIG. 2) and a lower frame 14 supported by vertically adjustable legs 16 to accommodate birds of various sizes.

The frame defines a main electrolyte basin 20 extending generally along the line of the conveyor 10 and below the same so that the heads of birds suspended from the conveyor will engage the electrolyte. The main basin 20 is in fluid communication with adjacent fluid chambers 22, 24, 26 which are described further below.

At the entrance to the basin, there is a guide plate 30 at the inlet thereof. The guide plate extends downward away from the basin so that the heads of approaching birds are gradually lifted by the guide plate and then fall into the electrolyte once they have cleared it.

A perforated aeration tube 32 extends the length of the basin substantially below the surface of the electrolyte and generally in the same plane as the overhead conveyor. The aeration tube is provided at intervals (preferably every two inches) with a series of aeration holes 34 of about ⅛ inch diameter.

Above the aeration tube 32, but just below the surface the electrolyte, a horizontal, perforated screen of baffle 36 is attached within the basin 20. The purpose of the screen is two-fold: (1) to break up the air stream emitted from the aeration tube and (2) to prevent aspiration of water by the birds, by limiting the depth to which their heads may protrude into the water.

At the outlet end of the stunner the screen terminates and is succeeded by a plurality of general cylindrical tubes or bars 40 (see detail, FIG. 3) extending generally in the direction of the conveyor and parallel to one another. These bars are inter-connected with spaces between them to form a grate 42 through which electrolyte can drain from the birds' heads and return to the basin 20. The grate 42 is supported within the frame of 14 by means of feet 44, and it can be easily removed from the frame for cleaning. The tubes 40 of the grate have leading portions 46 angled upward with respect to the horizontal so as to shorten the vertical distance between the stunner and the conveyor to insure maximum capture, particularly with respect to smaller birds within the population; the tubes' length is sufficient to permit thorough drainage of electrolyte from the stunned birds. The length of the path over which the birds are out of contact with the electrolyte prevents water from being plowed or pushed out of the container by the larger birds within the population as occurred in previous devices.

Figure 4:
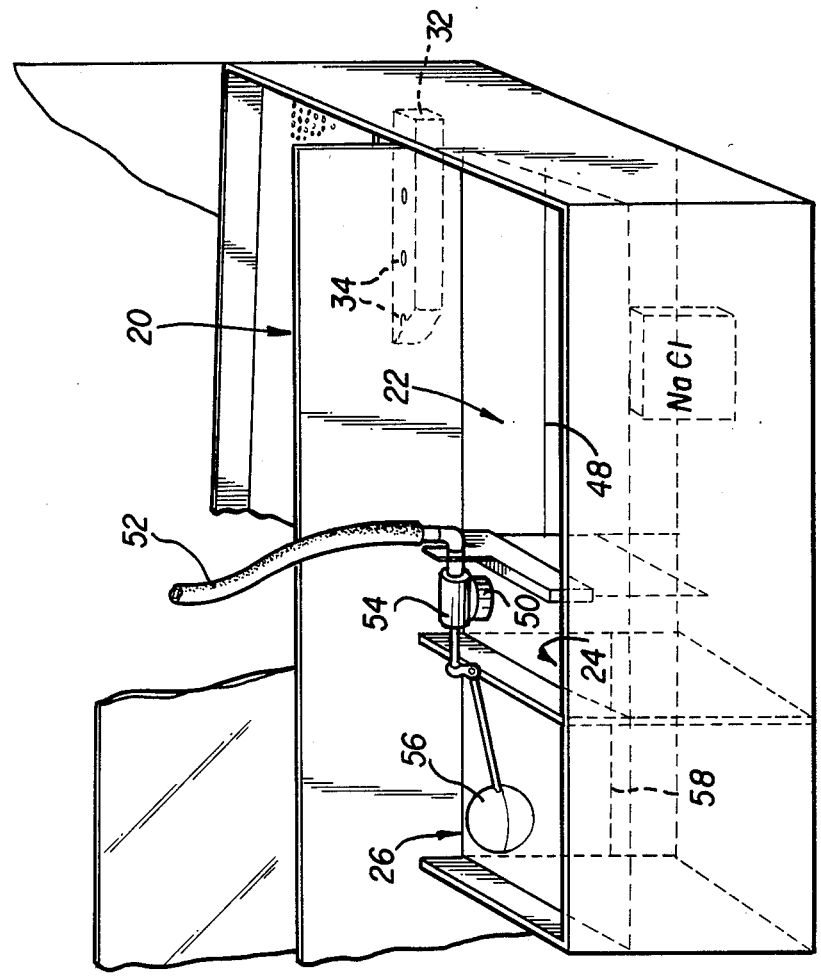
FIG. 4 is a detailed perspective view of another portion thereof.

FIG. 4 shows in detail the auxillary chambers 22, 24, 26, which are designated a salt chamber, an inlet chamber and the float chamber respectively. The salt chamber receives a block of salt (NaCl) which is slowly soluble in water. The salt chamber 22 is open at one lower side 48 to the main basin 20 so that its salt concentration is in equilibrium with the other chambers.

Although our apparatus greatly reduces electrolyte consumption, there is naturally some evaporation and some water is removed from the basin by the birds' heads. To replenish the lost liquid, the inlet chamber 24 has a water inlet 50 so disposed in or preferably slightly above the chamber to admit fresh water from a supply line 52. The inlet includes a float-controlled valve 54 that stabilizes electrolyte level.

The controlling float 56 is isolated from electrolyte in the inlet chamber 24 (because the turblence caused by the inlet water would adversely affect float operation); the float chamber 26 communicates only with the stunner bath via an opening at 58 and is therefore quiescent.

Referring once again to FIGS. 1 and 3, one can see in addition to structure previously described a bar 60 extending above the electrolyte level and parallel to the conveyor 10. This is a "rump bar" to prevent the birds from avoiding electrolyte by pulling up toward their feet. Also shown are plural rubber fingers 62 that extend towards the birds' breasts to prevent lateral movement of the birds while avoiding tissue injury.

Figure 5:
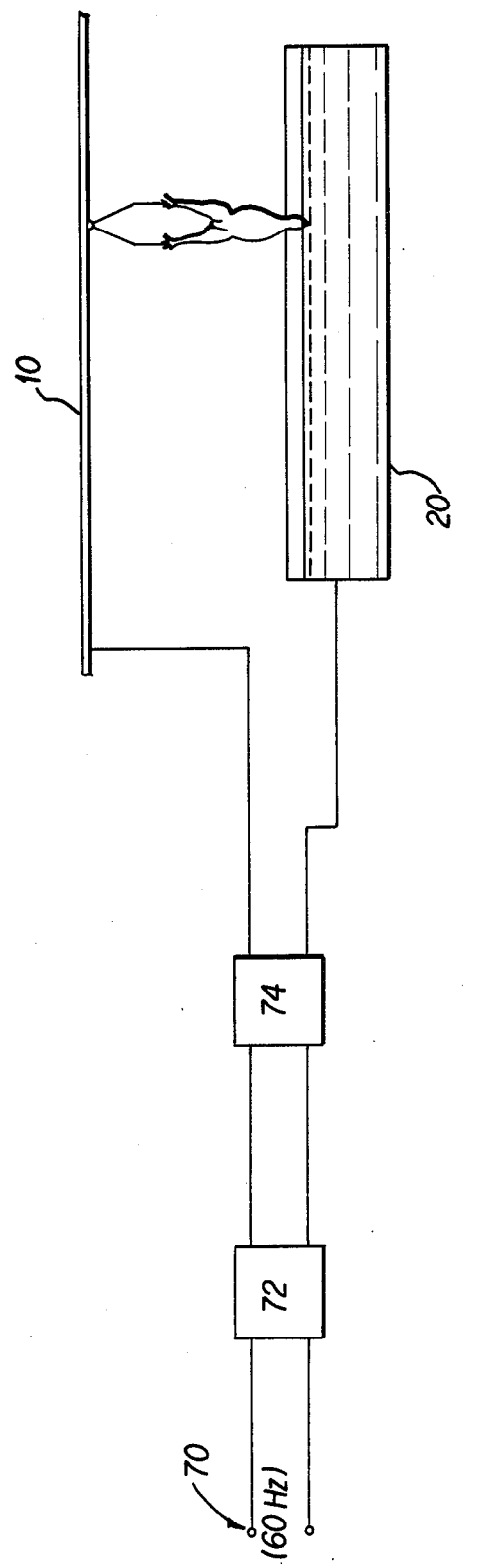
FIG. 5 is an electrical schematic of the invention.

The electrical circuitry for impressing the voltage between the conveyor and the electrolyte is shown in FIG. 5. This circuit includes sixty-cycle standard line source 70 acting as the input to a variable voltage supply 72 which in turn is connected to frequency converter 74. The output of the frequency converter is impressed across the electrodes, viz., conveyor 10 and basin 20. The frequency converter is commercially available from Georator, Manassas, Va. under Model No. 30,003. We prefer a stunning frequency of about 400 cycles per second at a voltage of 18 volts output, as we have found that the higher frequency produces a much less violent stun than does a sixty-cycle current and lasts longer. In addition, this permits the stunning voltage to be reduced, thereby reducing or eliminating the incidence of hemorraging that may result from higher voltages.

In use, a series of birds are carried over the stunner by the conveyor 10. As the birds' heads engage the guide plate 30 and then fall into the electrolyte, they are stunned by the voltage existing between the conveyor (which is in electrical communication with their feet) and the electrolyte. The electrolyte is continuously aerated by air supplied under pressure (for example 90 psi) to the aeration tube 32; and the aeration helps to insure good head contact with the birds by locally increasing the water level near the center of the bath. The stunned birds are carried through the basin by the conveyor and then across the drain rack 42, which lifts the heads of the birds from the water, allowing electrolyte to flow back to the basin 20, so that when the birds then leave the stunner they carry only a very small amount of electrolyte.

The stunner normally operates continuously for two work shifts and during this time substantially uniform electrolyte salinity has been observed, owing primarily to the low rate of electrolyte loss and to the selection of block salt for its slow dissolving rate. Not only is the salinity level much more stable than with previously known devices, but also the salt savings are significant. We estimate that the cost of a stunner will be returned early during its useful life on salt savings alone.

We have further observed improved yields from the combination of good electrolyte contact, stable salinity, high frequency and relatively low voltage, in that there is substantially less incidence of internal hemorraging and consequent product loss.

Inasmuch as the invention is subject to many variations modifications and changes in detail, it is intended that the foregoing should be regarded as illustrative only of the invention described in the following claims.

What is claimed is:

1. A poultry stunner comprising
   a conveyor for suspending a series of birds by their feet and carrying them along a predetermined path,
   means defining a basin for electrolyte, said basin extending below said conveyor along a portion of said path,
   means for impressing a relative voltage between said conveyor and said electrolyte basin,
   means downstream from said basin for draining electrolyte from said birds and returning said electrolyte to the basin,
   an aerator disposed in said electrolyte substantially vertically below said conveyor, and
   means for delivering compressed air to said aerator in order to locally increase the electrolyte level below the conveyor without requiring the addition of electrolyte.

2. The invention of claim 1, wherein said aerator comprises a perforated tube extending though said electrolyte basin substantially parallel to said conveyor.

3. The invention of claim 2 further comprising a horizontal perforated baffle attached within said basin vertically above said perforated tube.

4. The invention of claim 1, wherein said electrolyte draining means comprises a grate formed from parallel interconnected tubes, each having a leading portion angled upward with respect to the horizontal so as to lift heads of passing birds out of the electrolyte.

5. The invention of claim 1, further comprising a first auxiliary chamber communicating with said basin, and means for admitting fresh water to said first auxiliary chamber from a supply when said electrolyte falls below a given predetermined level.

6. The invention of claim 5 wherein said water admitting means is a valve controlled by a float.

7. The invention of claim 6, further comprising a second auxiliary chamber in direct communication with said basin but not with said first auxiliary chamber, said float being located in said second auxiliary chamber.

8. The invention of claim 7, further comprising a third auxiliary chamber adapted to retain therein a salt block, said third auxiliary chamber being in direct communication with said first auxiliary chamber and with said basin.

* * * * *